D. C. JACKSON.
TRAIN LIGHTING SYSTEM.
APPLICATION FILED MAY 5, 1906.

931,613.

Patented Aug. 17, 1909.
4 SHEETS—SHEET 1.

Witnesses:
Leonard W. Novander
George C. Higham

Inventor
Dugald C. Jackson
By Charles A. Brown
Attorney

D. C. JACKSON.
TRAIN LIGHTING SYSTEM.
APPLICATION FILED MAY 5, 1906.

931,613.

Patented Aug. 17, 1909.
4 SHEETS—SHEET 2.

Witnesses:
Leonard W. Novander
George P. Higham

Inventor
Dugald C. Jackson
By Charles A. Brown
Attorney

D. C. JACKSON.
TRAIN LIGHTING SYSTEM.
APPLICATION FILED MAY 5, 1906.

931,613.

Patented Aug. 17, 1909.
4 SHEETS—SHEET 3.

Witnesses:
Leonard W. Novander
George C. Higham

Inventor
Dugald C. Jackson
By Charles A. Brown
Attorney

UNITED STATES PATENT OFFICE.

DUGALD C. JACKSON, OF MADISON, WISCONSIN, ASSIGNOR TO DUGALD C. JACKSON AND WILLIAM B. JACKSON, OF MADISON, WISCONSIN, A COPARTNERSHIP.

TRAIN-LIGHTING SYSTEM.

No. 931,613.　　　　Specification of Letters Patent.　　　　Patented Aug. 17, 1909.

Application filed May 5, 1906. Serial No. 315,282.

*To all whom it may concern:*

Be it known that I, DUGALD C. JACKSON, a citizen of the United States, residing at Madison, in the county of Dane and State of Wisconsin, have invented a certain new and useful Improvement in Train-Lighting Systems, of which the following is a full, clear, concise, and exact description, reference being had to the accompanying drawings, forming a part of this specification.

My invention relates to train lighting systems, particularly to such systems in which the main supply source is dynamos or a dynamo driven from axles or an axle of the train.

In my system the main generator is an alternating current generator (more particularly an induction generator) which may be directly geared to an axle of the train, and rotary converters are used in the various cars of the train whose alternating current side is connected with the circuit from the generator and whose direct current side is connected with storage batteries and with the lighting circuits of the cars. The adjustment of the system is such that for speeds of the train under a predetermined speed, the storage batteries will supply current for the lighting circuits, but upon increase in speed over this predetermined speed the rotary converters will be supplied with current from the alternating current generator and will convert it into direct current for recharging the storage cells and for feeding the lighting circuits. Provision is made for automatically disconnecting the generator from the supply circuit when the speed is less than the aforesaid predetermined speed, and where the generator is of the polyphase type, provision is also made for automatically reversing its circuits in correspondence with reversal in direction of travel of the axle to which the generator is geared. Other automatic regulating means are also provided for controlling and regulating the operation of the main generator, the rotary converters and the storage batteries, and my system will be better understood by reference to the accompanying drawings, in which—

Figures 1, 2:
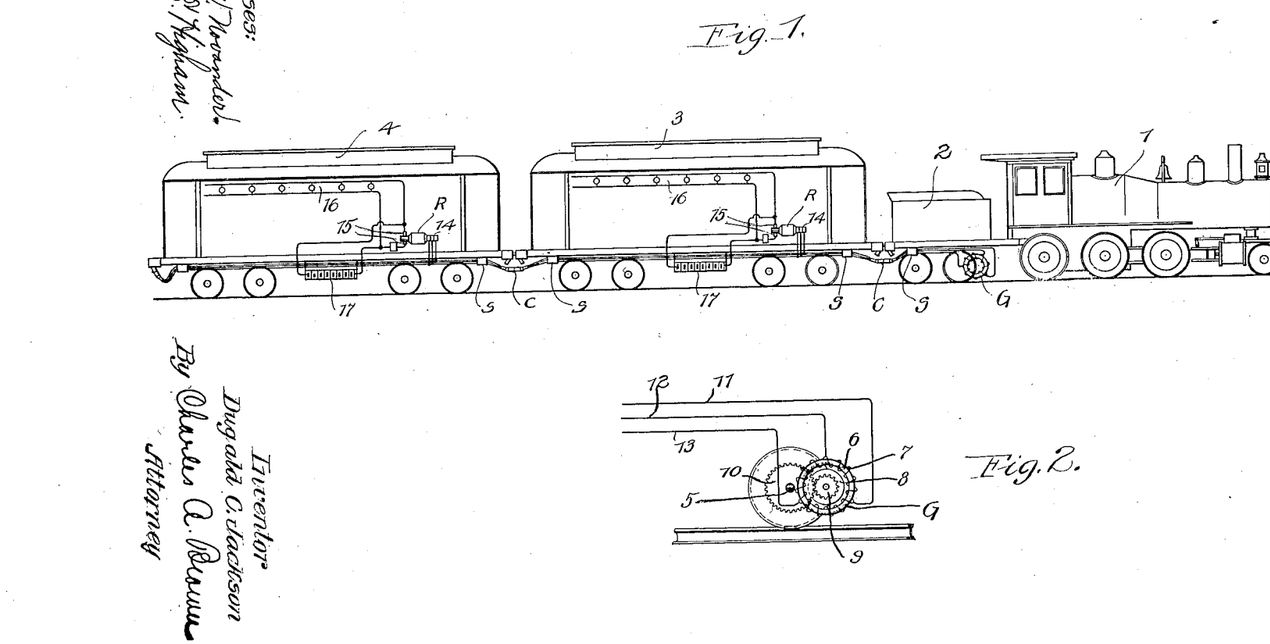
Figure 1 shows a complete train to which my system is applied.
Fig. 2 shows on a larger scale the mechanical connection of the main generator to the axle of the locomotive tender as indicated in Fig. 1.

In Fig. 1 the train is shown composed of the locomotive 1, the tender 2 and the cars 3 and 4, which may be of any number suitably coupled together. The main generator G for the illuminating system is shown as mounted upon the front axle 5 of the tender, the connection being best shown in Fig. 2. The generator will be suspended in any convenient manner, such as is prevalent in street car motors, for instance. The generator is shown as of the induction type having a stationary field frame 6 which may be either of drum or ring form and provided with the field winding 7. The armature 8 may be of the squirrel cage type or the wound type, and to the armature shaft is connected the pinion 9 meshing with the driving gear 10 mounted on the axle 5, and as the train moves the armature is driven. The generator shown in Figs. 1 and 2 is adapted to deliver three phase current, and the three conductors 11, 12 and 13 lead from the field winding and pass throughout the entire train. Suitable couplings C are provided for connecting the conductors through between cars, and a coupling, such as described in my copending application, Serial No. 246,403, filed February 20, 1905, could advantageously be employed. A switch S may also be employed at each end of a car to afford safety when coupling and uncoupling are performed, as described in said co-pending application. In each of the cars is placed a rotary converter R, whose collector rings 14 are suitably connected with the three main conductors from the generator and whose commutator brushes 15 are connected with the car lighting circuit 16 and with a storage battery 17.

As is well known, a machine like the ordinary induction motors will, when properly constructed, operate as a generator when given a speed greater than the speed corresponding to synchronism with a synchronous machine which is attached to, and operating on, the circuit, and this principle is used in the operation of my system. When the main generator is not in action, the storage battery in each car furnishes power for the car lighting circuit and for driving as a motor the rotary converter in the car, the speed of each rotary converter being determined by its armature winding and the strength of its field magnets. If the main generator be now connected with the supply circuit to the rotary converters when its speed is greater than that which would produce synchronous relation, the rotary converters become motors on the alternating current side and generators on the direct current side and will assume the burden of supplying current for the lighting circuits and for recharging the storage cells. For the performance of this operation it is manifestly necessary that the generator shall be connected in circuit only when its speed is higher than the speed of synchronism determined by the rotary converters when driven by the storage batteries as direct current motors. I therefore provide the generator with automatic cut-off switch mechanism which closes when the speed of the train rises to a certain value, for example 18 miles per hour, and which reopens when the speed falls below this value. A form of this automatic cut-off mechanism is shown in Figs. 3, 4, 5 and 6.

I have shown a generator in Figs. 1 and 2 in which the field frame is stationary, but the automatic cut-off mechanism referred to is shown, in Figs 3, 4, 5 and 6, associated with a machine with stationary armature and rotating field frame, the cut-off mechanism being somewhat simpler for this arrangement and therefore serving best for purposes of illustration. It is well understood that the principle and mode of operation of alternating current induction generators are the same whether the field magnet is stationary and the armature rotates or the armature is stationary and the field magnet rotates.

Figure 3:
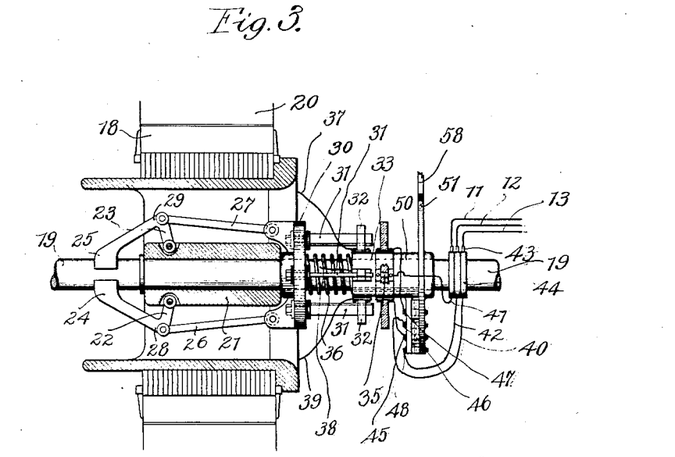
Fig. 3 is an enlarged view showing the construction and arrangement of automatic governing mechanism which may be used for opening and closing the supply circuit from the main generator with changes of speed.
Figure 4:
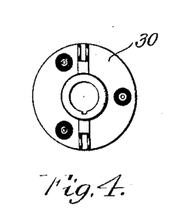
Fig. 4 is a detached view of the automatic governor head for supporting contact bars.
Figures 5, 6, 7, 8:
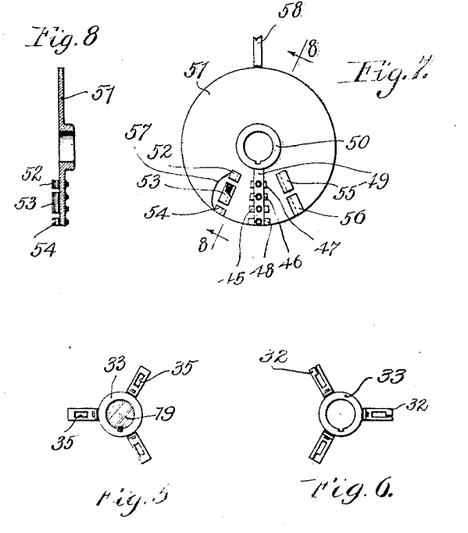
Fig. 5 is a detached view showing the frame for supporting contact jaws into which the contact bars pass.
Fig. 6 is a detached view showing the frame for supporting contact sleeves through which the contact bars pass.
Fig. 7 is a detached view of circuit changing mechanism.
Fig. 8 is a sectional view taken on line 8—8 of Fig. 7.
Figure 9:
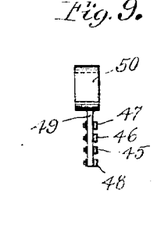
Fig. 9 is a view of a contact arm associated with the circuit changing mechanism in Fig. 7.

The field frame 18 in Fig. 3 is mounted on the shaft 19 and revolves within the stationary armature frame 20. Pivoted within the field frame and to opposite sides of the supporting hub 21 are the ends 22, 23, of bell crank levers, whose other ends 24 and 25 are weighted. Links 26 and 27 are pivoted to the elbows 28 and 29 of the bell crank levers and at their other end are pivoted to a head 30. Extending from this supporting head 30 are the three contact blades 31, suitably insulated from each other and passing through contact sleeves 32 also insulated from each other and carried on the hub 33 secured to the shaft 19. Secured to the hub 33 are also contact pockets or jaws 35 separably insulated from each other and in register with the contact sleeves 32. Disposed between the head 30 and the hub 33 is a compression spring 36. While the train is below the assumed minimum speed of 18 miles per hour, the spring 36 prevents sufficient movement of the governor mechanism to cause connection of the contact sleeves with the contact jaws, but when this speed is reached the weighted ends 24 and 25 will be sufficiently affected by the centrifugal force so that they are thrown out and cause the head 30 to move against the force of the spring 36 a sufficient distance to carry the ends of the contact bars 31 into engagement with the contact jaws 35 and as the contact sleeves are suitably connected with the field or current supplying winding through the conductors 37, 38 and 39, and the contact jaws are suitably connected with the supply conductors 11, 12 and 13 through conductors 40, 41 and 42, current will be delivered to these conductors from the current supplying winding and through the closed switching mechanism. When the speed becomes reduced below this fixed value the automatic mechanism is, of course, released and the supply winding disconnected from the supply conductors. The head 30 may be suitably arranged to slide along the shaft 19 and the hub 33 may be suitably secured to the shaft as by means of a key or bolt. The supply conductors 11, 12 and 13, are connected with the leads 40, 41 and 42 through the brushes 43 engaging the collector rings 44 carried by the shaft 19.

Where the generator is of the polyphase type it is necessary also to provide for reversing the current flow therefrom upon changes in direction of travel of the axle with which the generator is associated, and mechanism for automatically performing such circuit changes is illustrated in Figs. 3, 7, 8 and 9. Instead of directly connecting the leads 40 and 42 with the collector rings, these leads are broken, the broken ends of the conductor 40 connecting with the contact blades 45 and 46, while the broken ends of the conductor 42 connect with the contact blades 47 and 48. These contact blades are mounted in a row on an arm 49 extending from a hub 50 secured to the shaft 19, the contact blades being suitably insulated from each other. Adjacent to the arm 49 is a disk or plate 51 which is mounted on the shaft without a spline, and two sets of contact jaws are mounted on this plate, one set including the jaws 52, 53 and 54 and the other set including the jaws 55 and 56, these jaw sets being arranged in radial lines and disposed so that the contact blades of arm 49 may engage the contact jaws of either set. The jaws 52 and 54 are connected together through conductor 57 and are engaged respectively by the contact blades 47 and 48 during one position of the arm 49, while the middle jaw 53 engages the blades 45 and 46 during this position of the arm. During the other position of the arm the contact blades 47 and 46 engage in the jaw 55 and the blades 45 and 48 engage in the jaw 56. The disk 51 is arranged so that it does not move with perfect freedom but is retarded, which may be accomplished by associating some friction means therewith, as, for instance, a friction pad or block 58. If the generator shaft rotates in one direction, the arm 49 carried thereby rotates with it and the contact blades thereon engage the jaws of one set on the disk 51 which is carried with the arm and this circuit condition maintained. If the direction of rotation of the shaft is reversed, the arm is drawn away from the first set of jaws and the contact blades are carried into engagement with the other set of jaws, and the current flow through leads 40 to 42 is reversed. The back parts of the jaws are solid and when engaged by the contact blades of the arm act as stops which cause the disk 51 to rotate with the arm, but when the arm is moved away from one set of jaws the contact blades are released from those jaws owing to the action of the retarding or friction means on the disk 51. Thus, by means of the mechanism shown in Figs. 3, 4, 5, 6, 7, 8 and 9, the generator is automatically connected into circuit after synchronous speed is reached, and its circuit connections are automatically controlled to correspond to changes in direction of travel of the axle with which the generator is associated. The various contact blades and jaw members, of course, are suitably insulated in any well-known manner.

Suppose that the train has been duly made up and is standing at a station, it being evening and the lights turned on. The storage batteries in the various cars furnish the necessary current to operate the lights and also cause the armature of the rotary converter in each car to rotate without doing work, the generator, however, being disconnected from the circuit by the automatic switch. As the train pulls out from the station and comes up to full speed, it passes the speed of 18 miles an hour, at which speed it has been assumed that the generator exceeds the speed of synchronism corresponding to that of the converters, and the automatic switch connects the generator with the supply conductors 11, 12 and 13. The rotary converters now operate to transfer energy from the alternating current circuit to the direct current circuit and this energy is used for the lights and if the lights do not consume all the energy delivered to the direct current circuit by the converters, part of the current is used in recharging the battery cells. During the day time when no lights or electric motors are in use on the train, all the energy is available for recharging the batteries. The amount of energy delivered by the generator will depend upon the speed of the train and should come to a maximum at some intermediate speed between the switching in speed and the maximum at which the train runs. The generator may desirably be designed to give its maximum torque at a speed corresponding to the average speed of the train in such relation that the batteries may be kept in the best condition of charge throughout a run, and so that there shall be no waste of energy. As an induction machine has a curved torque-speed characteristic it is possible to design the generator so that it will give a suitable amount of energy to the charging circuit in any particular run to which the train is assigned and thus keep the batteries in the best condition. As soon as the train slows down below the speed of 18 miles an hour, the automatic switch again disconnects the generator from circuit and current for lights or electric motors must thereafter be obtained from the storage batteries.

It will be seen that the system of lighting just described, requires no special means for controlling the excitation or other extraneous means for controlling the pressure of the generator, but when the alternating current frequency of the train circuit at which the generator or generators may be connected to the circuit is suitably set up by the rotary converters, the generator will then play its part appropriately. The train circuit, however, must be arranged properly so that all the rotary converters will come into circuit in the same phase relations, that is, the successive alternating current polarities must be delivered into the circuit in exactly the same manner by all the rotary converters of a train. This may be provided for by carrying the main train conductors 11, 12 and 13 to all the cars in exactly the same manner, connecting the rotary converters with the car wiring in exactly the same manner and putting the storage batteries into connection with the rotary converters with their like poles connected similarly. The coupling terminals at the ends of the cars must be rights and lefts and all must be connected to the train conductors in a similar manner so that any of the cars may be turned around without interfering with the proper operative connections of the circuits.

Figure 10:
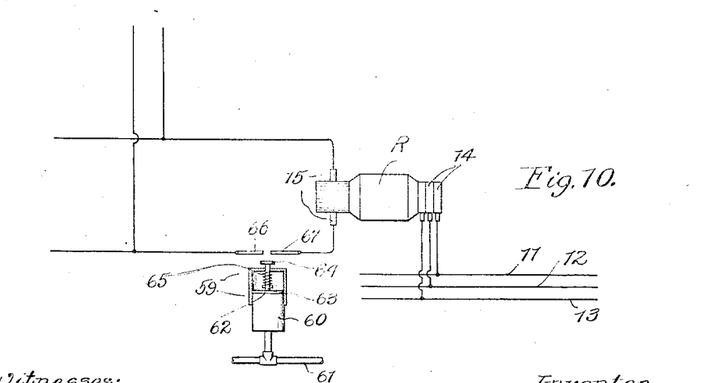
Fig. 10 is a diagrammatic view showing circuit controlling means associated with a rotary converter and controlled by the air pressure system associated with the car.

If a car is set on a side track or otherwise removed from a train, it becomes desirable to protect the storage battery from unnecessarily driving the rotary converter as a motor. Although this requires relatively little energy it is desirable to have the battery as small as possible to save weight and expense. I therefore provide for automatically disconnecting the rotary converter from the battery at such times. For this purpose I provide a pneumatic switch 59 (Fig. 10) comprising a cylinder 60 connected through piping 61 with the air brake receiver or reservoir on the car and a plunger 62 within the cylinder connected through stem 63 with a contact blade 64, a spring 65 tending to hold the plunger and contact blade away from the contact points 66 and 67 interposed in the circuit connecting the rotary converter with the battery. When the car is at rest the air pressure is removed and the spring 65 becomes effective to disconnect the contact blade 64 from the contact points, thereby opening the circuit to the rotary converter, but as soon as the car is to be run, the air brake system is connected with the pressure supply and the plunger is forced upwardly to carry the contact blade into engagement with the points 66 and 67, thereby closing the rotary converter circuit. The lighting circuits for the car, however, remain in connection with the battery. This control of the rotary converter circuit is also entirely automatic in its operation.

Figure 11:
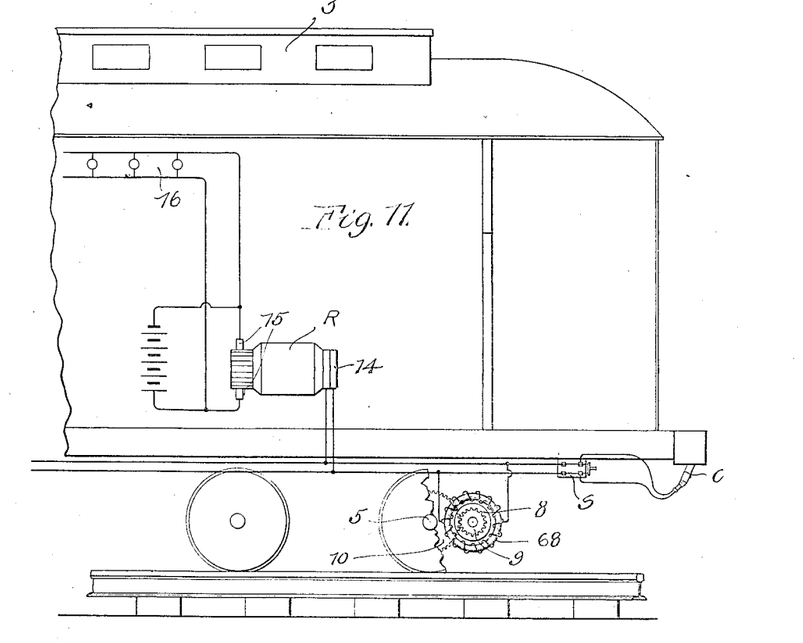
Fig. 11 is a partial view of a car showing an arrangement where the main generator is of the single phase type, and Fig. 12 diagrammatically illustrates automatic end cell controlled mechanism which may be utilized for regulating the storage batteries employed in my system.

As heretofore stated, the system may be either polyphase, as thus far described, or single phase, and in Fig. 11 is shown an arrangement used with a single phase system. In this system the rotary converter is connected with the two wires of the single phase circuit and with the storage battery and car circuits in the same manner as in the polyphase system just described. The automatic switching mechanism for cutting the generator into and out of circuit is also used with single phase generator 68 which is mounted on one of the car axles in the same manner as the generator described with reference to Figs. 1 and 2. The automatic reversing arrangement, however, is not necessary where a single phase generator is employed, as the action of a single phase induction generator is independent of the direction of its rotation. The operation of the system otherwise is like that described with reference to the polyphase generator.

Where generators are used on individual cars the electric light equipment may be operated even though a car is connected in a train which does not have such equipment on the other cars, or the equipped cars may be operated in trains, in which case it is desirable to couple the circuits of the several cars together so that the generators may help each other. Such individually equipped cars may also be connected in trains with a generator at the locomotive, as illustrated in Fig. 1, and in that case the individual generators may be cut out, or they may be allowed to contribute their share toward the total effect. All the car equipments that are worked together in electrical relation must be of the same kind, but cars may also be connected in the same train without interconnecting them electrically if some of them bear single phase equipments and others bear polyphase equipments. Where there are several generators on the train, it is preferable not to operate with the generators connected in parallel unless some means are provided for affording opportunity for the generators to all get into phase relation. Of course, where only one generator is employed it should be of sufficient capacity to furnish the requirements of the entire train, while the generator mounted on an individual car need only be of sufficient capacity for the particular car. The rotary converter on each car also needs only be of sufficient capacity to supply the wants of that particular car.

Where a single phase system is used with a single generator carried at the locomotive, three wires may be led through the train, one of the wires connecting to a collector ring terminal at each rotary converter, and the other wire from the generator may run to the rear of the train where it is connected with the third conductor which is connected to the remaining collector ring of each of the rotary converters. By this means the loss of pressure in the train wires is more uniformly distributed between the cars.

Figure 12:
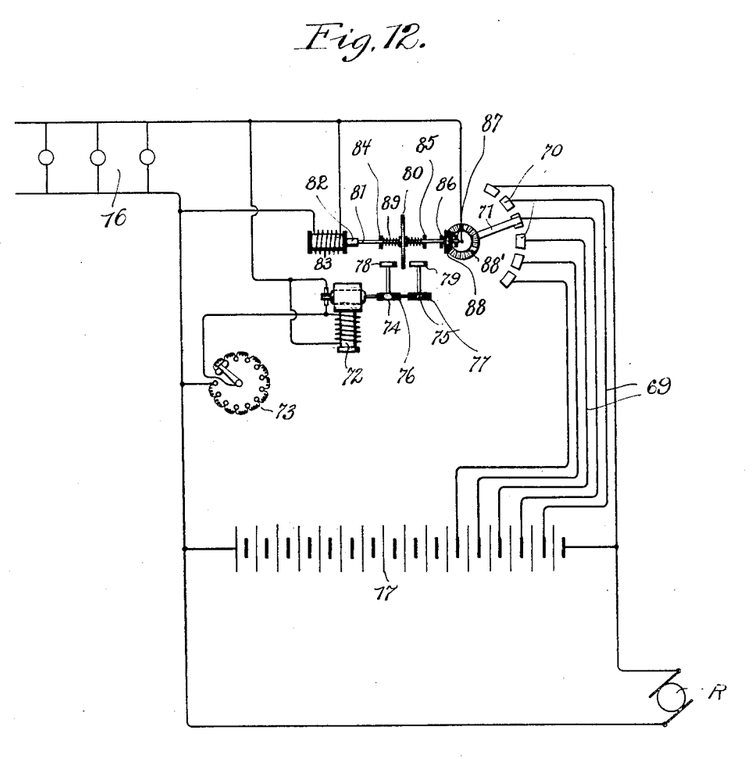

In the system of train lighting just described, the electrical pressure at the lamps and the constancy of the illumination are controlled by the pressure of the storage battery. The ordinary lead plate storage battery, however, may vary materially in pressure during the periods of charge and discharge, and when such a battery is used it becomes desirable to introduce regulating means to keep the pressure constant. For this purpose end cell controlling and regulating mechanism may be advantageously employed and adapted to be entirely automatic in its operation, and in Fig. 12 I have shown one arrangement of end cell controlling mechanism which may be employed. In this arrangement rotary converter R connects directly with the storage battery 17, while the terminals of the end cells are connected through conductors 69 with the contact plates 70 to be engaged by the arm 71 of the end cell switch, this arm being connected with one limb of the lighting circuit, whose other limb connects with the other end of the storage battery. A small motor 72 is connected in bridge of the lighting circuit through a controlling resistance 73. The shaft of this motor connects with the worm wheels 74 and 75 respectively engaging the worm gears 76 and 77 which respectively drive friction pinions 78 and 79 adapted for engagement with opposite sides of a friction disk 80. This friction disk is secured to a stem 81 extending from the core 82 surrounded by the solenoid winding 83 which is connected in bridge of the lighting circuit. This stem 81 passes through guide frames 84, 85, 86 and 87 and the hub of a bevel pinion 88 which is located at the end of the stem and is held between the guide frames 86 and 87 and engaging with the bevel gear 88' secured to the end of the arm 71. A spline on the stem engages with a keyway in the hub of the pinion, so that the pinion is caused to rotate with the stem, but the stem may be moved longitudinally without disturbing the position of the pinion. A spring 89 surrounding the stem between the guide 84 and the friction disk tends to hold this disk against the friction pinion 79, but when the pressure of the lamp circuit is normal the attraction of the core 82 and the force of the spring 89 are balanced to hold the friction disk in a position midway between the friction pinion. As the pressure increases above normal, the attraction on the core becomes stronger and the friction disk is pulled against the friction pinion 78 and the friction disk being rotated the stem 81 and gear pinion 88 will be rotated to cause the arm 71 to travel over the contact plates 70 to cut out a sufficient number of end cells to cause the pressure to be restored to normal. When the pressure drops below normal the spring 89 moves the friction wheel against the pinion 79 and the bevel pinion 88 will rotate in an opposite direction to move the arm 71 to reconnect sufficient end cells in circuit to restore the pressure to normal. This control of the pressure by means of end cells is entirely automatic.

As the rotary converter connects directly with the storage battery, the end cells may become more or less overcharged, but any disadvantageous effects may be cared for when the cars are idle by interchanging of cells or by other means such as switching the parts of the batteries in parallel with each other for equalizing purposes, or a suitable means may be introduced to automatically equalize the rate of charging. With ordinary storage batteries, however, no provision need be made against overcharging, as the batteries will stand the required work without such provision.

I thus provide a very efficient and very simple system for supplying a train with electrical energy for operating electric lights, electric motors or other translating devices, the system being automatic in its operations. The generator pressure is inherently adjusted to meet as closely as possible the requirements of the lamps and the generators are operated without any regulating devices outside of the automatic connecting switch and the reversing switch mechanisms which have been described. The system would operate without any end cell switches or other pressure regulating devices, or cell protecting devices, but it is desirable to utilize these auxiliary devices when the common lead storage cells are used. If a storage battery could be utilized which is free from changes of pressure during the periods of charge and discharge, such auxiliary devices would be unneeded. The lights in each car are serviceable at any time whether the car be coupled in a train or standing alone, and the illumination is at all times equally efficient.

I do not wish to be limited to the exact arrangements herein described. Various modifications may be made in the arrangements of the system, and the various automatic controlling mechanisms which I have described are merely for the sake of illustration, and various other forms of mechanisms of this kind could be employed with equal advantage with my system without departing from the scope and spirit of my invention.

I claim as new and desire to secure by Letters Patent:

1. In a train lighting system, the combination with an alternating current generator adapted to be driven by the movement of the train, of a synchronous motor mechanism on the train adapted for connection with the generator, direct current generator mechanism driven by the motor mechanism for supplying translating devices on the train, said alternating current generator being normally disconnected from the synchronous motor mechanism, and means actuated when the speed of the train reaches a predetermined value to connect the generator with the synchronous motor mechanism.

2. In a system of train lighting, the combination with an alternating current generator adapted to be driven by the movement of the train, of a rotary converter connected at its alternating current side with the generator, a circuit for translating devices connected with the direct current side of the rotary converter, a battery for feeding the translating devices when the speed of the train is below a predetermined value, and means for disconnecting the generator from circuit when the speed of the train is below the predetermined value and for connecting the generator in circuit when the speed reaches the predetermined value whereby the rotary converter is driven to supply current to the translating devices.

3. In a system of train lighting, the combination with an alternating current generator adapted to be driven by the motion of the train, a rotary converter connected at its alternating current side with the mains from the generator, a storage battery for supplying current to the translating devices and for driving the rotary converter when the train is at rest, and means for disconnecting the generator from circuit during the time that the speed of the train is below that which would give the generator a speed below that equal to synchronous speed determined by the rotary converter, and for connecting said generator in circuit when it is driven at a speed greater than that of synchronism whereby the rotary converter will be driven by the alternating current from the generator to supply the current flow for the translating devices and for recharging the storage battery.

4. In a system of train lighting, the combination with an alternating current generator adapted to be driven by the movement of the train, a rotary converter connected at its alternating current side with the supply mains from said generator, means automatically controlled by the speed of the train for disconnecting the generator from circuit when the speed thereof is below a predetermined value, a storage battery for supplying current to the translating devices to be operated and for driving the rotary converter during the time that the generator is disconnected from circuit, said automatically controlled means causing the generator to be connected in circuit when the speed thereof exceeds the speed of synchronism determined by the rotary converter whereby the rotary converter will be driven by the alternating current to supply the translating devices and to recharge the storage battery.

5. In a system of train lighting, the combination with an alternating current generator adapted to be driven by the movement of the train and which is normally disconnected from circuit, a rotary-converter connected at its alternating current side with the generator mains, a storage battery for supplying current to the translating devices to be operated and for driving said rotary converter when the generator is disconnected from circuit, and means automatically controlled by the speed of the train for connecting the generator in circuit when its speed exceeds that of the speed of synchronism determined by the rotary converter whereupon said rotary converter is driven as a motor from the alternating current side to deliver current from its direct current side.

6. In a system of train lighting, the combination with an alternating current generator adapted to be driven by the motion of the train, of mains leading to the cars of the train, said generator being normally disconnected from said mains, a rotary converter in each car connected with its alternating current side to the mains, a storage battery in each car for supplying current to the translating devices therein and for driving the corresponding rotary converter when the main generator is disconnected from the mains, and means for automatically connecting the generator in circuit upon movement of the train when the speed of the generator exceeds the speed of synchronism determined by the rotary converters, whereupon the rotary converters are driven by the alternating current on the generator to supply the current for the translating devices in the cars and for recharging the storage batteries.

7. In a system of train lighting, the combination with a polyphase generator adapted to be driven by the movement of the train but normally disconnected from circuit, a rotary converter connected at its alternating current side to the mains from the polyphase generator, a storage battery for driving the rotary converter and for supplying the translating devices to be operated when the generator is disconnected from circuit, means automatically controlled to connect the generator in circuit when its speed exceeds the speed of synchronism in the rotary converter whereupon said generator assumes the burden of the translating devices, and means for automatically reversing the current flow through the generator upon change in direction of travel of the train.

8. In a system of train lighting, the combination with an alternating current induction generator adapted to be driven by the movement of the train but normally disconnected from circuit, of rotary converters connected with supply mains from the generator, storage batteries, said rotary converters and storage batteries serving for the immediate sources of supply to the translating devices to be operated, and means automatically actuated upon movement of the train to connect the generator in circuit when its pressure exceeds a predetermined value whereupon said generator assumes the burden of current supply to the translating devices.

9. In a system of train lighting, the combination of an alternating current generator adapted to be driven by the movement of the train, synchronous motor mechanism in each car of the train, a main circuit with which all the synchronous motor mechanisms are connected, said generator being normally disconnected from the main circuit, a source of direct current in each car of the train connected with the synchronous motor mechanism therein, a translating circuit in each car connected with the direct current source therein to be normally fed by said direct current source, and means controlled by the movement of the train for connecting said generator with the main circuit when a speed greater than that of synchronism is reached whereupon said translating circuits will be supplied directly from the alternating current generator.

10. The combination of an alternating current induction generator driven by an axle of a train, a rotary converter on a car which operates jointly as a frequency setter for the induction generator and as a converter into direct current energy of alternating current energy delivered by the generator, translating devices for utilizing the direct current energy, a storage battery connected with the rotary converter and with the translating device and acting jointly as a reservoir of energy and a means for fixing the minimum speed of the frequency setter, and switching devices for bringing the generator into circuit with the converter when the generator speed rises above a predetermined value and for disconnecting the generator when its speed falls below the predetermined value.

11. The combination of an alternating current induction generator, a device for converting the alternating current energy of the generator into direct current energy and operating as a frequency setter for the induction generator, a storage battery connected with the device and serving as a reservoir for energy, and switching mechanism for connecting the generator to said device when the speed of the generator rises above predetermined value and disconnecting it when the speed falls below a predetermined value.

12. The combination of an alternating current induction generator, a synchronous frequency setter acting as a converter for converting the alternating current energy of the generator into direct current energy, and a storage battery for controlling the frequency setter.

13. The combination of an alternating current induction generator, a frequency setter acting as a converter for converting the alternating current energy of the generator into direct current energy, and a source of electrical energy for controlling the frequency setter.

14. In a system of train lighting, the combination with a polyphase generator adapted to be driven by the movement of the train and adapted for connection with a main circuit, of a rotary converter connected at its alternating current side to the main circuit, a storage battery for driving the rotary converter and for supplying translating devices when the generator is not operating, and means for automatically reversing the current flow through the generator upon change in direction of travel of the train.

In witness whereof, I hereunto subscribe my name this 27th day of April A. D., 1906.

DUGALD C. JACKSON.

Witnesses:
 CHARLES J. SCHMIDT,
 LEONARD W. NOVANDER.